United States Patent [19]
Taniguchi et al.

[11] Patent Number: 5,729,007
[45] Date of Patent: Mar. 17, 1998

[54] POSITION DETECTING APPARATUS AND POSITION DETECTING METHOD USING THE SAME

[75] Inventors: Takao Taniguchi, Okazaki; Nobuaki Miki, Kariya; Takenori Kano, Toyota; Toshiya Morishita, Hekinan; Ken Kiyama, Nishio; Naoto Ogasawara, Chiryu; Naotaka Murakami, Nishio, all of Japan

[73] Assignee: Aisin AW Co., Ltd., Aichi-ken, Japan

[21] Appl. No.: 653,442

[22] Filed: May 24, 1996

[30] Foreign Application Priority Data

May 31, 1995 [JP] Japan .................................. 7-133008

[51] Int. Cl.⁶ ...................................................... G01D 5/34
[52] U.S. Cl. ............................. 250/231.13; 250/231.18; 364/424.095
[58] Field of Search .................. 250/231.13, 231.14, 250/231.16, 231.18; 180/170; 364/424.095, 424.08, 424.096

[56] References Cited

U.S. PATENT DOCUMENTS 5,061,848 10/1991 Choi ................................. 250/231.18
5,086,641 2/1992 Roselli ............................ 250/231.18

FOREIGN PATENT DOCUMENTS 6-280973 10/1994 Japan .

*Primary Examiner*—Que Le
*Attorney, Agent, or Firm*—Oliff & Berridge P.L.C.

[57] ABSTRACT

A slotted rotor is fixed to a manual shaft operatable by using a shift lever. The slotted rotor is turnable in a restricted angle about the manual shaft. The rotor has a slot in arc segment a, slots in arc segment b, slots in arc segment c, slots in arc segment d, and slots in arc segment e that are arranged concentrically about the manual shaft, in that order starting from the manual shaft. As the rotor turns, the slots in arc segments d, e cause incremental pulses to be generated. Based on the number of pulses, a control unit detects deviation from the planned neutral position and establishes a correct neutral position. The position detecting apparatus and method make it easy for a worker to perform the neutral position alignment of a neutral start switch and to maintain the alignment after the switch has been mounted.

20 Claims, 6 Drawing Sheets

FIG. 7

| POSITION | P | R | N | D | 3 | 2 | L |
|---|---|---|---|---|---|---|---|
| Number of Pulse. Shift Direction from "N" | −15 | −3 ⁓ −14 | 2 ⁓ −2 | 3 ⁓ 10 | 11 ⁓ 17 | 18 ⁓ 26 | 27 |

POSITION DETECTING APPARATUS AND POSITION DETECTING METHOD USING THE SAME

BACKGROUND OF THE INVENTION

The invention relates to a position detecting apparatus for detecting the position of a shift lever of a vehicle and a position detecting method using the apparatus, and more particularly to a position detecting apparatus that has a learning function enabling the setting of the correct neutral ("N") position by using the learning function of a control unit, and a position detecting method using the apparatus.

DESCRIPTION OF RELATED ART

A conventional switch for detecting the position of a vehicular shift lever employs a structure described in, for example, Japanese patent application publication No. HEI 6-280973. The position detecting switch is mounted on the casing of an automatic transmission by inserting a rotative shaft rotatable together with the operation of a shift lever into a through hole formed in the casing of the automatic transmission and then fitting a position detecting switch into the rotative shaft while aligning the rotative shaft with a through hole formed in the switch.

When the switch is fitted on the rotative shaft, a pivotable member of the switch couples to the rotative shaft to become pivotable together with the rotative shaft. The position detecting switch is then turned about the rotative shaft until the pivotable member is aligned with a predetermined position of the position detecting switch (for example, the center of the "N" range). The position detecting switch is then fixed to the automatic transmission casing in the aligned position by a bolt or the like.

However, since the conventional art described above requires a worker to align and fix the position detection switch when mounting the position detecting switch on the automatic transmission casing, the art takes many manhours. In addition, since the position detecting switch is aligned and fixed according to a determination by the worker, the conventional art makes it difficult to achieve exact alignment of the detecting switch, leading to precision deterioration.

SUMMARY OF THE INVENTION

Accordingly, it is an object of the invention to provide a position detecting apparatus that eliminates the problems stated above, that is, eliminates the need to align the detecting switch when mounting it on an automatic transmission casing, so as to reduce the required manhours and improve precision, and to provide a position detecting method using the apparatus.

(1) According to an aspect of the invention, there is provided a position detecting apparatus comprising means for detecting a signal indicating the position of a shift lever; means for outputting incremental pulse signals that increment throughout the entire positional range of the shift lever; and a control unit for establishing a predetermined correct position on the basis of the signal indicating the position of the shift lever and the incremental pulse signals.

(2) Preferably, the position detecting apparatus described in the paragraph (1) further comprises memory means for storing various ranges determined within the entire positional range of the shift lever and the predetermined correct position; pulse signal number detecting means for detecting the number of pulse signals generated by shift operation on the basis of the incremental pulse signals; calculating means for calculating a difference between the number of pulse signals generated by a shift from the predetermined correct position to a neighboring range and the number of pulse signals that are generated by a shift from a mounted position to the neighboring range and that are detected by the pulse signal number detecting means; and correcting means for, on the basis of a calculation result provided by the calculating means, correcting the various ranges stored in the memory means so that the mounted position coincides with the predetermined correct position.

(3) In the position detecting apparatus described in paragraph (2), it is preferred that the incremental pulse signals comprise two lines of signals that are shifted 90° in phase from each other, and that direction detecting means be provided for detecting a shift direction by using a combination of the two lines of signals, and that the position of the shift lever be detected on the basis of the direction detected by the direction detecting means and the number of pulse signals detected by the pulse signal number detecting means.

(4) In the position detecting apparatus described in the paragraph (3), it is preferred that the means for detecting the signal indicating the position of the shift lever and the means for outputting incremental pulse signals that increment throughout the entire positional range of the shift lever comprise a rotor rotatable in accordance with operation of the shift lever; a plurality of groups of slots formed in the rotor; and photosensors arranged on a stationary member corresponding to the groups of slots, the means for outputting incremental pulse signals comprising two outside rows of slots provided in the rotor and the photosensors corresponding to the two outside rows of slots.

(5) In the position detecting apparatus according to any one of the paragraphs (1) to (4), the predetermined correct position can be established in more than one of the various ranges.

(6) According to another aspect of the invention, there is provided a position detecting method comprising the steps of detecting a signal indicating a position of a shift level and outputting incremental pulse signals that increment throughout the entire positional range of the shift lever; inputting the signal indicating the position of the shift lever and the incremental pulse signals to a control unit; determining a difference between the number of pulse signals generated by a shift from a predetermined correct position to a neighboring range and the number of pulse signals generated from a mounted position to the neighboring range; correcting various ranges stored in memory means on the basis of the difference; and detecting the position of the shift lever on the basis of direction of a shift and the number of pulse signals with reference to the corrected various ranges.

(7) In the position detecting method described in the paragraph (6), the predetermined correct position can be established in more than one of the various ranges.

With the simple structure described in the paragraph (1) comprising means for detecting a signal indicating the position of a shift lever; means for outputting incremental pulse signals that increment throughout the entire positional range of the shift lever; and a control unit for establishing a predetermined correct position on the basis of the signal indicating the position of the shift lever and the incremental pulse signals, the position detecting apparatus eliminates the need for a worker to perform position alignment when mounting a position detecting switch so that the required manhours can be reduced and the precision can be improved.

Further, since the position detecting apparatus described in paragraph (2) further comprises correcting means for correcting the various ranges so that a mounted position will coincide with the predetermined correct position, on the basis of a calculation result provided by the calculating means for calculating a difference between the number of pulse signals generated by a shift from the predetermined correct position to a neighboring range and the number of pulse signals that are generated by a shift from the mounted position to the neighboring range and that are detected by the pulse signal number detecting means, the apparatus eliminates the need for a worker to perform position alignment when mounting a position detecting switch so that the required manhours can be reduced and the precision can be improved.

Since the position detecting apparatus described in the paragraph (3) detects the position of the shift lever on the basis of the direction detected by the direction detecting means and the number of pulse signals detected by the pulse signal number detecting means, the apparatus allows for detection of the position of the shift lever with reference to the corrected ranges.

With the structure described in the paragraph (4) wherein the means for detecting the signal indicating position of the shift lever and the means for outputting incremental pulse signals that increment throughout the entire positional range of the shift lever comprise a rotor rotatable in accordance with operation of the shift lever; a plurality of groups of slots formed in the rotor; and photosensors arranged on a stationary member corresponding to the groups of slots, and the means for outputting incremental pulse signals comprises two outside rows of slots provided in the rotor and the photosensors corresponding to the two outside rows of slots, the position detecting apparatus allows for increased intervals between the slots formed in the rotor for outputting incremental pulse signals and, therefore, prevention of misdetection by the photosensors.

With the structure described in the paragraph (5) wherein the predetermined correct position is provided in each of the various ranges, correction with respect to the position can be performed every time the shift lever is operated, thus maintaining the precise position detection.

Since the position detecting method described in the paragraph (6) allows the position detecting switch to be mounted with a rough precision and achieves position alignment simply by operating the shift lever, the method will reduce the required manhours and improve the precision.

With the method described in the paragraph (7) wherein the predetermined correct position is provided in each of the various ranges, correction with respect to the position can be performed every time the shift lever is operated, thus maintaining the precise position detection.

BRIEF DESCRIPTION OF THE DRAWINGS

The foregoing and further objects, features and advantages of the invention will become apparent from the following description of preferred embodiments with reference to the accompanying drawings, wherein:

FIG. 7 is a table showing the number of pulses and shifting direction with respect to positions determined with reference to the "N" position of the position detecting apparatus according to an embodiment.

DETAILED DESCRIPTION OF PREFERRED EMBODIMENTS

Preferred embodiments of the invention will be described hereinafter with reference to the accompanying drawings.

Figure 1:
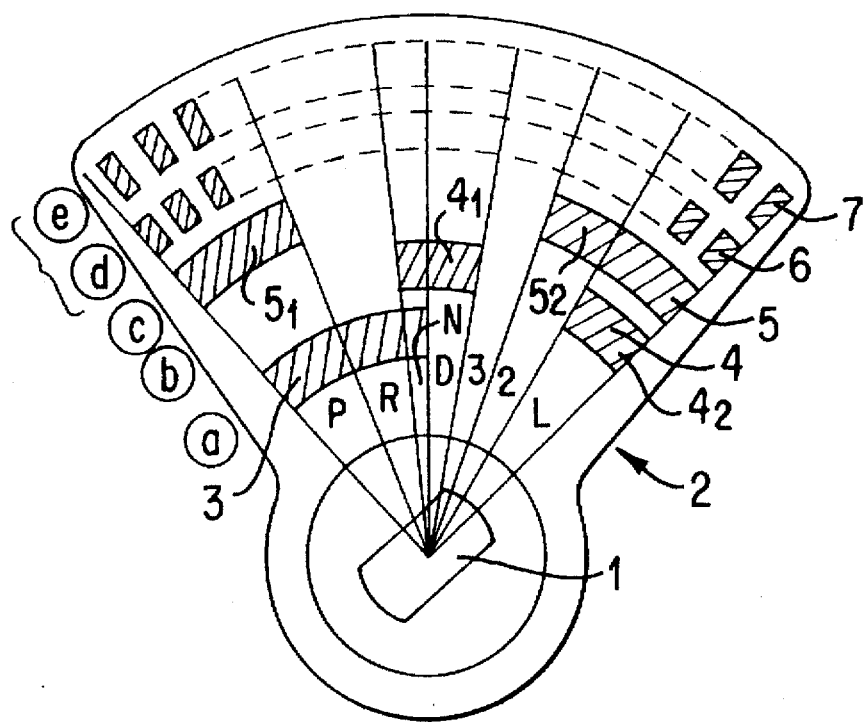
FIG. 1 is a plan view of a rotor of a position detecting switch according to an embodiment of the position detecting apparatus of the invention.
Figure 2:
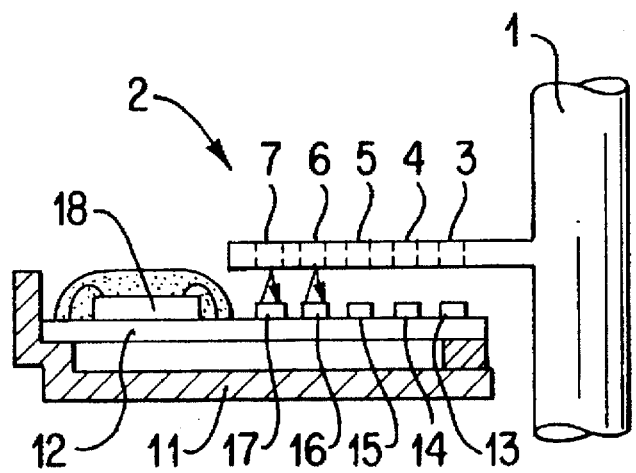
FIG. 2 is a sectional view of the embodiment of the position detecting apparatus of the invention.

A position detecting switch using a photosensor according to an embodiment will first be described with reference to FIGS. 1 to 3. A slotted rotor 2 is fixed to a manual shaft 1 of an automatic transmission. The slotted rotor 2 is turnable within a restricted angle about the manual shaft 1, which is operated by using a shift lever.

The rotor 2 has a slot 3 in row a, slots 4 ($4_1$, $4_2$) in row b, slots 5 ($5_1$, $5_2$) in row c, slots 6 in row d, and slots 7 in row e that are arranged concentrically about the manual shaft 1, in that order starting from the manual shaft 1. The portion of the rotor 2 other than the slots serves as a light reflector.

A base board 12 fixed to a casing 11, corresponding to the slotted rotor 2, carries five photosensors (photointerrupters) 13–17 each of which is composed of a light emitting element and a light receiving element. The photosensors 13–17 are aligned radially to the rotor 2, along a single radius, and positioned where arcs transcribed by the slot 3, the slots 4 ($4_1$, $4_2$), the slots 5 ($5_1$, $5_2$), the slots 6 and the slots 7 intersect the radius, respectively. The output signals from the photosensors are input to a control unit (ECU, that is, a computer).

The operation of the position detecting switch will be described.

(1) If an array of sensors 13–15 are positioned under the slotted rotor 2 corresponding to the "P" range by rotation of the slotted rotor 2, the light from the light emitting element of the photosensor 13 passes through the slot 3 and is not received by the light receiving element of the photosensor 13, so that the photosensor 13 outputs an OFF signal "0". In this situation, the photosensor 14 does not face any slot. Therefore, the light from the light emitting element of the photosensor 14 is reflected by the slotted rotor 2 and received by the light receiving element of the photosensor 14, so that the photosensor 14 outputs an ON signal "1". The light from the light emitting element of the photosensor 15 passes through a slot $5_1$ and is not received by the light receiving element of the photosensor 15, so that the photosensor 15 outputs the OFF signal "0". Thereby, the control unit 18 can determine that the shift lever is in the "P" position.

(2) If the manual shaft 1 is turned counterclockwise rotating the slotter rotor 2 until the photosensors 13–15 are positioned relative to the "R" range of the slotted rotor 2, the light from the light emitting element of the photosensor 13 passes through the slot 3 and is not received by the light receiving element of the photosensor 13, so that the photosensor 13 outputs the OFF signal "0". Because the photosensor 14 does not face a slot, the light from the light emitting element of the photosensor 14 is reflected by the slotted rotor 2 and received by the light receiving element, so that the photosensor 14 outputs the ON signal "1". Similarly, because the photosensor 15 does not face a slot, the light from the light emitting element of the photosensor 15 is reflected by the slotted rotor 2 and received by the light receiving element, so that the photosensor 15 outputs the ON signal "1". Thereby, the control unit 18 can determine that the shift lever is in the "R" position.

(3) If the manual shaft 1 is further turned counterclockwise moving the slotted rotor 2 until the photosensors 13–15 are positioned relative to the "N" range of the slotted rotor 2, the light from the light emitting element of the photosensor 13 passes through the slot 3 and is not received by the light receiving element of the photosensor 13, so that the photosensor 13 outputs the OFF signal "0". Similarly, the light from the light emitting element of the photosensor 14 passes through the slot $4_1$ and is not received by the light receiving element, so that the photosensor 14 outputs the OFF signal "0". However, because the photosensor 15 does not face a slot, the light from the light emitting element of the photosensor 15 is reflected by the slotted rotor 2 and received by the light receiving element, so that the photosensor 15 outputs the ON signal "1". Thereby, the control unit 18 can determine that the shift lever is in the "N" position.

(4) If the manual shaft 1 is further turned counterclockwise until the photosensors 13–15 are positioned relative to the "D" range of the slotted rotor 2, the photosensor 13 does not face the slot 3. Then, the light from the light emitting element of the photosensor 13 is reflected by the slotted rotor 2 and received by the light receiving element of the photosensor 13, so that the photosensor 13 outputs the ON signal "1". Conversely, the light from the light emitting element of the photosensor 14 passes through the slot $4_1$ and is not received by the light receiving element, so that the photosensor 14 outputs the OFF signal "0". Because the photosensor 15 does not face a slot, the light from the light emitting element of the photosensor 15 is reflected by the slotted rotor 2 and received by the light receiving element, so that the photosensor 15 outputs the ON signal "1". Thereby, the control unit 18 can determine that the shift lever is in the "D" position.

(5) If the manual shaft 1, with the slotted rotor 2, is further turned counterclockwise until the photosensors 13–15 are positioned relative to the "3" range of the slotted rotor 2, none of the photosensors 13–15 faces a slot. Then, the light from the light emitting elements of each the photosensors 13–15 is reflected by the slotted rotor 2 and received by their respective light receiving elements, so that the photosensors 13–15 output the ON signal "1". Thereby, the control unit 18 can determine that the shift lever is in the "3", position.

(6) If the manual shaft 1, with the slotted rotor 2, is further turned counterclockwise until the photosensors 13–15 are positioned relative to the "2" range of the slotted rotor 2, neither of the photosensors 13, 14 faces a slot. Then, the light from the light emitting elements of the photosensors 13, 14 is reflected by the slotted rotor 2 and received by the respective light receiving elements, so that the photosensors 13, 14 output the ON signal "1". Conversely, the light from the light emitting element of the photosensor 15 passes through a slot $5_2$ and is not received by the light receiving element of the photosensor 15, so that the photosensor 15 outputs the OFF signal "0". Thereby, the control unit 18 can determine that the shift lever is in the "2" position.

(7) If the manual shaft 1, with the slotted rotor 2, is further turned counterclockwise until the photosensors 13–15 are positioned relative to the range of the slotted rotor 2, the photosensor 13 does not face the slot 3. The light from the light emitting element of the photosensor 13 is reflected by the slotted rotor 2 and received by the light receiving element, so that the photosensor 13 outputs the ON signal "1". Conversely, the light from the light emitting element of the photosensor 14 passes through the slot $4_2$ and is not received by the light receiving element of the photosensor 14, so that the photosensor 14 outputs the OFF signal "0". Similarly, the light from the light emitting element of the photosensor 15 passes through a slot $5_2$ and is not received by the light receiving element of the photosensor 15, so that the photosensor 15 outputs the OFF signal "0". Thereby, the control unit 18 can determine that the shift lever is in the "L" position.

As described above, the control unit 18 can determine the position of the shift lever by reading the output signals from the photosensors 13–15.

According to this embodiment, the slots 6, 7 are arranged at predetermined intervals, radially outside the slots 5. The slots 6 and 7 are arranged to provide a 90° phase shift between the pulses generated thereby. The slots 6 are associated with to the photosensor 16, and the slots 7 are associated with the photosensor 17.

Figure 3:
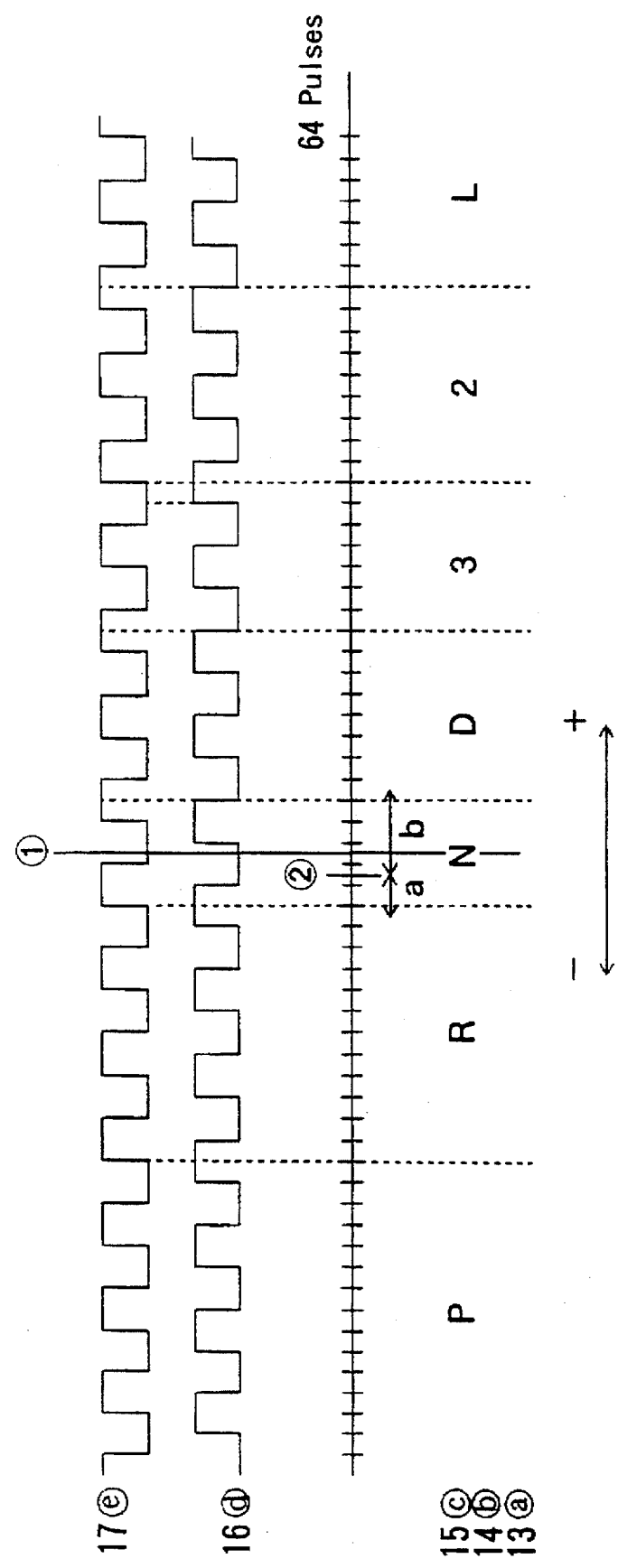
FIG. 3 indicates output signals from a photosensor according to the embodiment.

As the slot rotor 2 is turned from the "P" position to the "L" position, the photosensors 16, 17 generate pulse signals d, e that are shifted 90° in phase from each other as shown in FIG. 3. Pulses are formed at each rise and fall of the pulse signals. According to this embodiment, 64 pulses are generated for the entire turning range of the shift lever.

The generation of the pulses will be described with reference to FIGS. 4(a) to 4(d), which illustrate the generation of incremental pulses from the photosensors according to the embodiment.

Figure 4A:
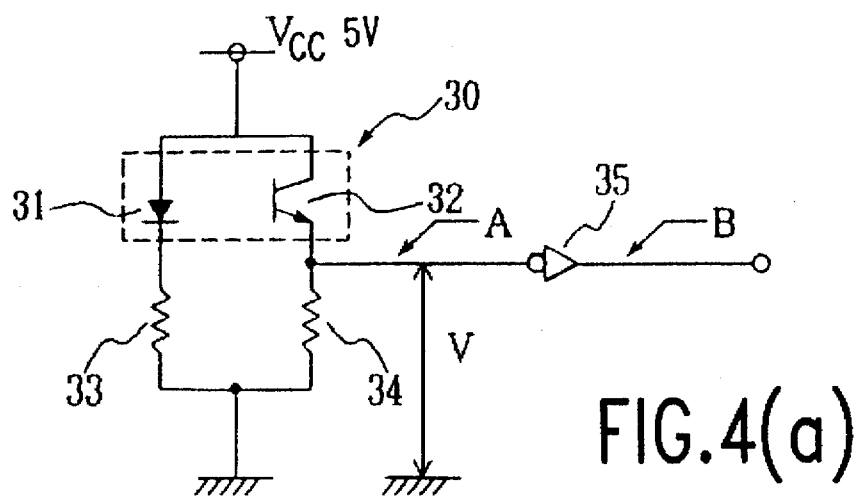
FIGS. 4(a) to 4(d) illustrate the generation of incremental pulses from the photosensor according to the embodiment.

Referring to FIG. 4(a), a photosensor (photointerrupter) 30 comprises a light emitting diode 31 and a phototransistor 32 that are connected in parallel facing each other. The slotted rotor (not shown) is provided in the light path between the light emitting diode 30 and the phototransistor 31 as previously described. The photosensor 30 is powered by Vcc (5 V). The cathode of the light emitting diode 31 and the phototransistor 32 of the photosensor 30 are grounded via a resistor 33 and a resistor 34, respectively. A signal line A leading from a circuit line between the phototransistor 32 and the resistor 34 is connected to an inverter 35. A signal line B from the inverter is connected to a control unit (not shown).

Figure 4B:
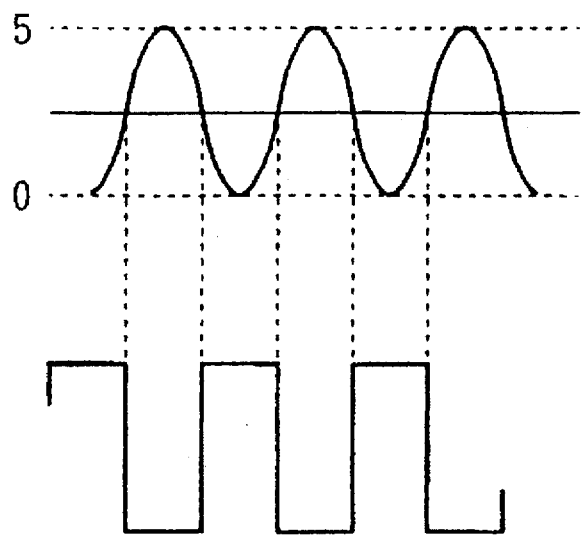

As the slotted rotor (not shown) is turned, the phototransistor 32 switches on and off, depending on whether reflected light is received as discussed above, producing output voltage V through the signal line A as indicated in FIG. 4(b).

Figure 4C:
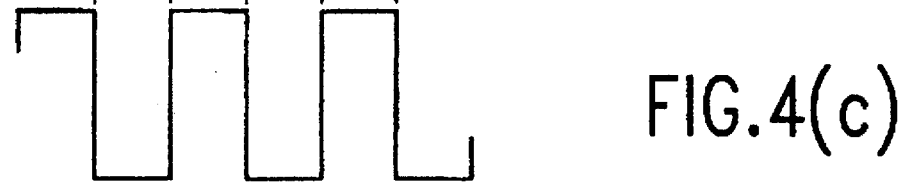

The inverter 35 converts the output voltage V into a rectangular pulse waveform as indicated in FIG. 4(c).

Figure 4D:
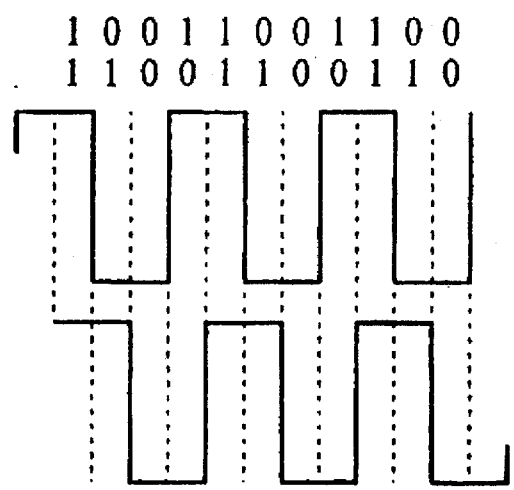

Because the slots 6, 7 of the slotted rotor are arranged to produce a 90° phase shift, the rectangular pulse waveforms as indicated in FIG. 4(c) are generated in such a fashion that the waveforms are shifted 90° in phase from each other as indicated in FIG. 4(d).

Because of the two output pulse waveforms, the combination of signals on the "+" side of a predetermined position from the combination of signals on the "−" side always differ from each other, the control unit is able to determine the direction, that is, the "+" direction or the "−" direction.

In addition, the number of pulses obtained by counting the rise and fall of each pulse enables the control unit to determine position.

Thus, the embodiment also makes it possible to perform the learning for the position detecting switch to determine position, which will later be described in detail.

Figure 5:
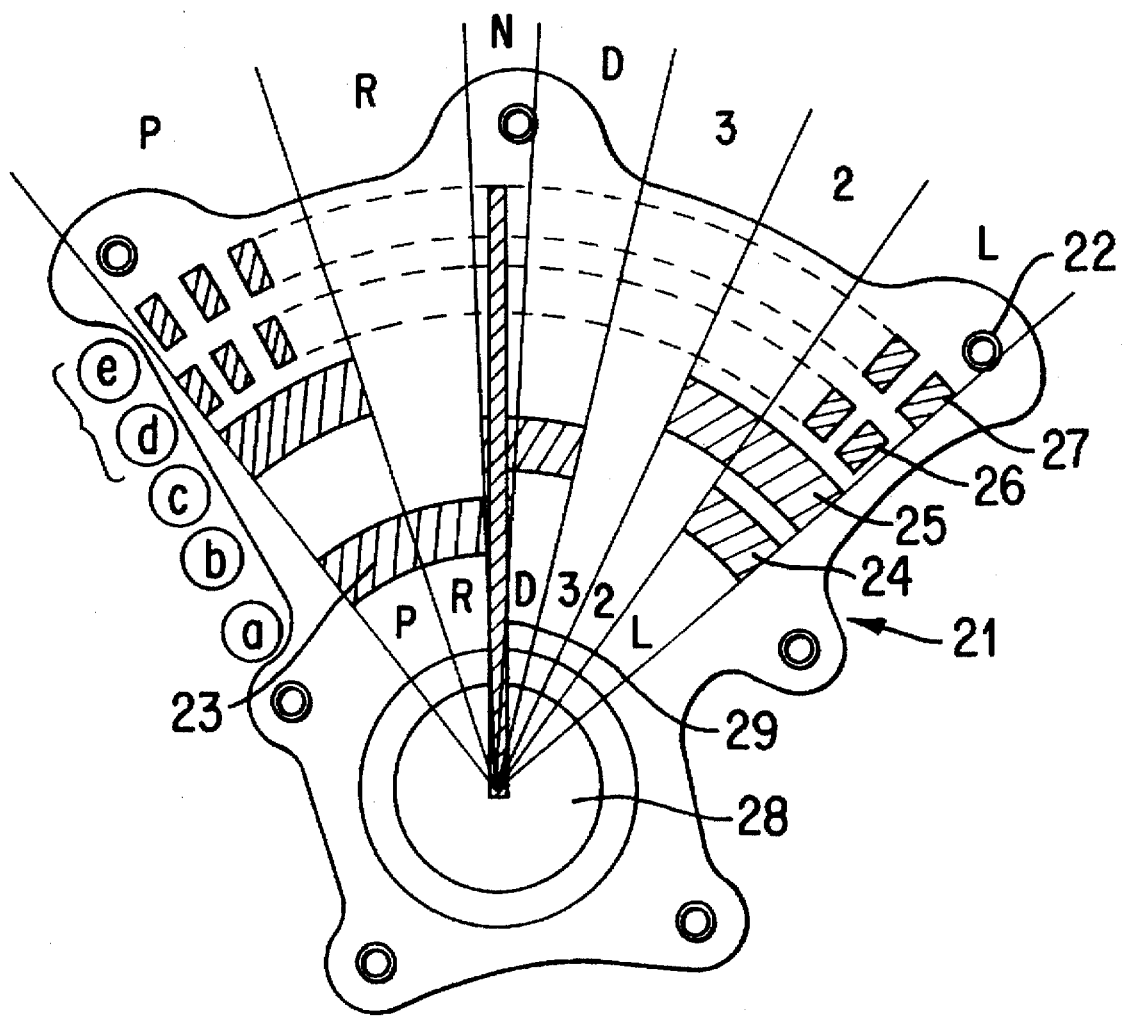
FIG. 5 is a plan view of a position detecting switch according to another embodiment of the position detecting apparatus of the invention.

Although the position detecting switch according to the embodiment employs photosensors, the position detecting switch may employ a contact mechanism comprising stationary and movable contact pieces, according to the invention as shown in FIG. 5. FIG. 5 is a plan view of a position detecting switch of another embodiment of the position detecting apparatus of the invention.

A terminal plate 21 has mounting portions by which the terminal plate 21 is fixed to a fixture portion. The terminal plate 21 carries stationary contact pieces 23–27 that are arranged in a pattern similar to that of the slots of the rotor described above. A movable contact piece 29 is fixed to a manual shaft 28.

As a shift lever (not shown) is operated, the manual shaft 28 is turned together with the movable contact piece 29, so that ON-OFF signals will be generated from the stationary contact pieces 23–25 as in the embodiment described above. By reading in such signals, a control unit (not shown) can determine the position of the shift lever.

By using the pulse signals from the stationary contact pieces 26, 27, the learning, or counting, by the position detecting switch to determine position can be performed.

In addition, the position detecting switch may be formed by using magnetic sensors. In such a position detecting switch, the movable part may be a magnet and the stationary parts may be Hall elements or magneto-resistance elements.

Next described will be the setting of the "N" position by the learning function using the position detecting switch according to the invention.

Figure 6:
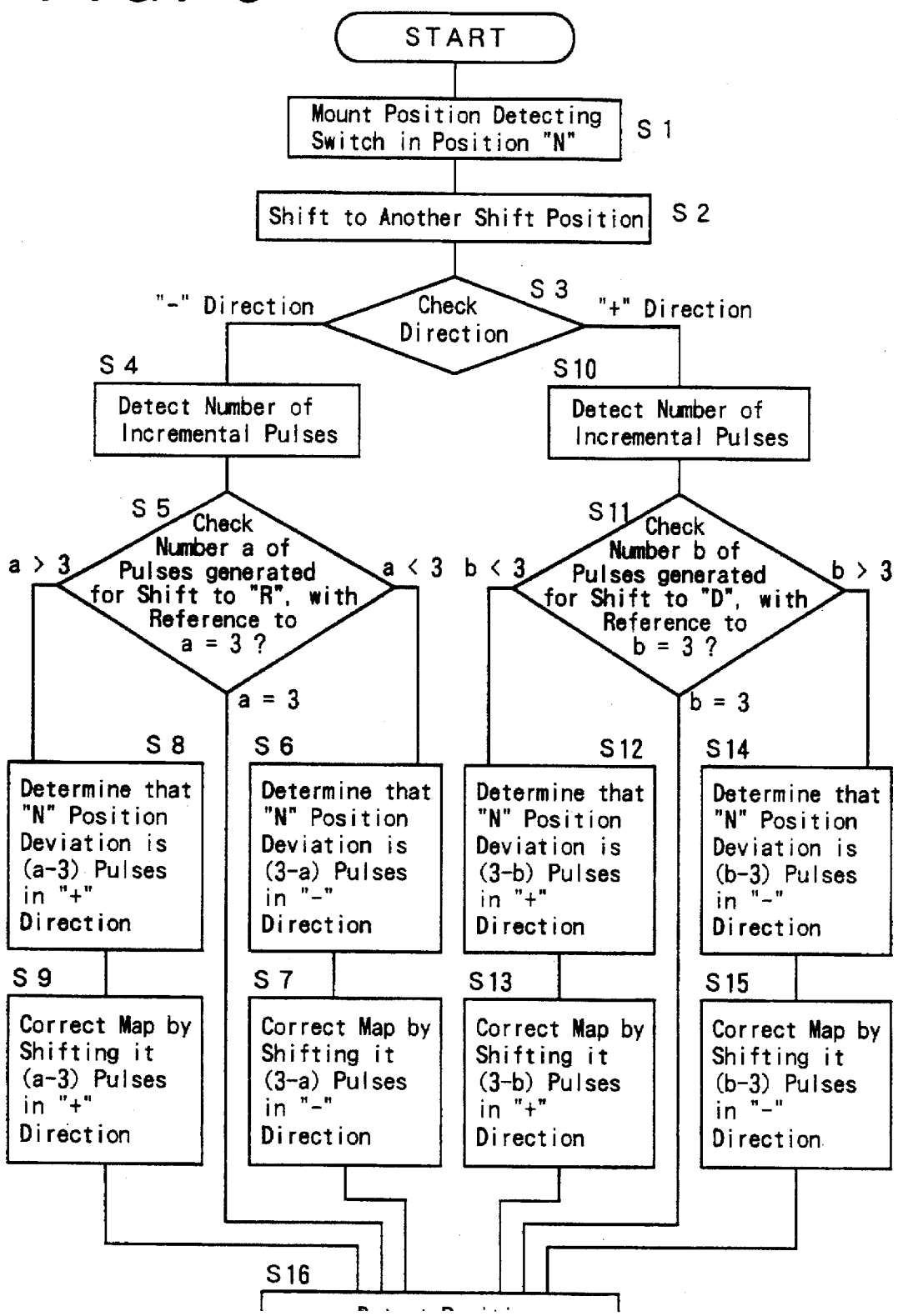
FIG. 6 is a flowchart illustrating the operation of setting the position detecting apparatus according to an embodiment.

FIG. 6 is a flowchart illustrating the operation of setting the position detecting apparatus according to an embodiment of the invention.

(1) First, a position detecting switch is mounted on the casing of an automatic transmission in step S1. It is not necessary to perform position alignment in this step.

(2) The shift operation is performed to shift to another position in step S2.

(3) By using the incremental pulses generated by the slots of the rows d and e, it is determined which of the directions the shift operation is performed in, that is, the "–" direction or the "+" direction, in step S3.

(4) It is determined in step S3 that the shift has been performed in the "–" direction, the number of pulses generated for achievement of a shift to another shift position is detected in step S4.

(5) Then, the number a of pulses is examined in step S5. For example, if the number a of pulses generated for achievement of the shift to the "R", or reverse position, equals 3, this means that the position detecting switch has been mounted in the correct position, according to the embodiment. In this case, the setting operation immediately proceeds to step S16 to perform position detection.

(6) If it is determined in step S5 that the number a of pulses is less than 3, that is, a<3, it is then determined in step S6 that the deviation of "N" position is (3–a) number of pulses in the "–" direction.

(7) Then, the map is corrected by shifting it by (3–a) number of pulses in the "–" direction in step S7 followed by the position detection in step S16.

(8) It is determined in step S5 that the number a of pulses is greater than 3, that is, a>3, it is then determined in step S8 that the deviation of "N" position is (a–3) number of pulses in the "+" direction.

(9) The map is then corrected by shifting it by (a–3) number of pulses in the "+" direction in step S9 followed by the position detection in step S16.

(10) On the other hand, if it is determined in step S3 that the shift operation has been performed in the "+" direction, the number of pulses generated for achievement of a shift to another shift position is detected in step S10.

(11) Then, the number b of pulses is examined in step S11. For example, if the number b of pulses generated for achievement of the shift to the "D", or the drive position, equals 3, this means that the position detecting switch has been mounted in the correct position, according to the embodiment. In this case, the setting operation immediately proceeds to step S16 to perform position detection.

(12) If it is determined in step S11 that the number b of pulses is less than 3, that is, b<3, it is then determined in step S12 that the deviation of "N" position is (3–b) number of pulses in the "+" direction.

(13) Then, the map is corrected by shifting it by (3–b) number of pulses in the "+" direction in step S13 followed by the position detection in step S16.

(14) If it is determined in step S11 that the number b of pulses is greater than 3, that is, b>3, it is then determined in step S14 that the deviation of "N" position is (b–3) number of pulses in the "–" direction.

(15) The map is then corrected by shifting it by (b–3) number of pulses in the "–" direction in step S15 followed by the position detection in step S16.

If shift operation is performed in the "–" direction in a case as indicated in FIG. 3 where the correct position is 1, and the mount position is 2 so that a<3 and b>3, the map is corrected by shifting it by (3–a) number of pulses in the direction through steps S4–S7 followed by position detection.

If shift operation is performed in the "+" direction, the map is corrected by shifting it by (b–3) number of pulses in the "–" direction through steps 10, 11, 14, 15 followed by position detection.

The number of pulses and shift direction from the "N" position to the various shift positions are shown in FIG. 7. More specifically, the "N" range lies over 2 to –2 in pulse number from the center of the "N" position, that is, two incremental pulses in the "+" direction and two incremental pulses in the "–" direction from the center of the "N" position. The "R" range is from –3 to –14 in pulse number, that is, 3 to 14 incremental pulses in the "–" direction. The "P" range is at –15 in pulse number and below.

Conversely, the "D" range is from 3 to 10 incremental pulses in the "+" direction. The "2" range is from 11 to 17 incremental pulses in the "+" direction. The "2" range is from 18 to 26 incremental pulses in the "+" direction. The "L" range is 27 or more incremental pulses away "+" the direction from the center.

If the position detecting switch is mounted in a position outside the "N" range, the map will be corrected by counting the incremental pulses, so that position detection can be performed.

While the invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. A position detecting apparatus, comprising:

means for detecting a signal indicating a position of a shift lever;

means for outputting incremental pulse signals that increment throughout an entire positional range of the shift lever; and a control unit for establishing a predetermined correct position on the basis of the signal indicating the position of the shift lever and a count of the incremental pulse signals.

2. The position detecting apparatus according to claim 1, further comprising:

memory means for storing various ranges determined within the entire positional range of the shift lever and the predetermined correct position;

pulse signal number detecting means for detecting the number of pulse signals generated by shift operation on the basis of the incremental pulse signals;

calculating means for calculating a difference between the number of pulse signals generated by a shift from the predetermined correct position to a neighboring range and the number of pulse signals that are generated by a shift from a mounted position to the neighboring range and that are detected by the pulse signal number detecting means; and correcting means for, on the basis of a calculation result provided by the calculating means, correcting the various ranges stored in the memory means so that the mounted position coincides with the predetermined correct position.

3. The position detecting apparatus according to claim 2, wherein the incremental pulse signals comprise two lines of signals that are shifted 90° in phase from each other, and wherein direction detecting means is provided for detecting shift direction by using a combination of the two lines of signals, and wherein position of the shift lever is detected on the basis of the direction detected by the direction detecting means and the number of pulse signals detected by the pulse signal number detecting means.

4. The position detecting apparatus according to claim 3, wherein the means for detecting the signal indicating the position of the shift lever and the means for outputting incremental pulse signals that increment throughout the entire positional range of the shift lever comprise:

a rotor rotatable in accordance with operation of the shift lever;

a plurality of groups of slots formed in the rotor; and photosensors arranged on a stationary member to correspond to the groups of slots, the means for outputting incremental pulse signals comprising two outside rows of slots provided in the rotor and the photosensors corresponding to the two outside rows of slots.

5. The position detecting apparatus according to claim 3, wherein the means for detecting the signal indicating the position of the shift lever and the means for outputting incremental pulse signals that increment throughout the entire positional range of the shift lever comprise:

a rotor rotatable in accordance with operation of the shift lever;

a plurality of groups of segment contacts mounted on a side of the rotor; and a radial contact mounted on a side of a stationary member to oppose and selectively contact the segment contacts on the side of the rotor, the means for outputting incremental pulse signals comprising two outside groups of segment contacts provided on the side of the rotor, the radial contact selectively making contact with the segment contacts of the two outside groups of segment contacts.

6. The position detecting apparatus according to claim 1, wherein the predetermined correct position can be established in any of the various ranges.

7. The position detecting apparatus according to claim 2, wherein the predetermined correct position can be established in any of the various ranges.

8. The position detecting apparatus according to claim 3, wherein the predetermined correct position can be established in any of the various ranges.

9. The position detecting apparatus according to claim 4, wherein the predetermined correct position can be established in any of the various ranges.

10. The position detecting apparatus according to claim 5, wherein the predetermined correct position can be established in any of the various ranges.

11. A position detecting method, comprising the steps of:

detecting a signal indicating a position of a shift lever and outputting incremental pulse signals that increment throughout entire positional range of the shift lever;

inputting the signal indicating the position of the shift lever and the incremental pulse signals to a control unit;

determining a difference between the number of pulse signals generated by a shift from a predetermined correct position to a neighboring range and the number of pulse signals generated from a mounted position to the neighboring range;

correcting various ranges stored in memory means on the basis of the difference; and detecting the position of the shift lever on the basis of a direction of a shift and the number of pulse signals with reference to the corrected various ranges.

12. The position detecting method according to claim 11, wherein the predetermined correct position can be established in any of the various ranges.

13. A shift position determining apparatus for a multi-position control, comprising:

a shift rod mounting a position plate for moving the position plate from one position to an alternate position;

a stationary detector for outputting signals indicative of movement of the plate; and correction means for correcting a position map of positions assumable by the multi-position control based upon movement of the shift rod from a first position to one of a second and a third position immediately adjacent and on either side of the first position.

14. The shift position determining apparatus according to claim 13, further comprising:

means on the position plate for indicating a position of the shift rod;

means on the position plate for providing a measure of incremental movement of the position plate;

means on the stationary detector for reading the means for indicating a position and the means for providing a measure to output a count of incremental movement and a position indication.

15. The shift position determining apparatus according to claim 14, further comprising:

a memory for storing a plurality of position ranges in terms of increments and increment counts when the shift rod is moved from the first position to one of the second and third positions; and means for adjusting the plurality of position ranges based upon increment counts when moving from the first position to the one of the second and third positions.

16. The shift position determining apparatus according to claim 14, wherein the position plate has a plurality of rows of indicators for positions and increments and the stationary detector has a detector associated with each row of indicators for outputting the signals.

17. The shift position determining apparatus according to claim 16, wherein each row has at least one slot and at least two rows have a plurality of slots, the slots of one of the at least two rows offset from but overlappingly aligned with the slots of the other rows and the stationary detector has a photosensor as each detector.

18. The shift position determining apparatus according to claim 16, wherein each row has at least one contact and at least two rows have a plurality of contacts, the contacts of one of the at least two rows offset from but overlappingly aligned with the contacts of the other row and the stationary detector has a contact that opposes the rows of contacts on the rotor.

19. The shift position determining apparatus according to claim 17, wherein the shift rod rotates, the rows lie along concentric arcs, and the photosensors are arranged along a radius defined from a center of rotation of the shift rod.

20. The shift position determining apparatus according to claim 18, wherein the shift rod rotates, the rows lie along concentric arcs, and the contact of the stationary detector is arranged along a radius defined from a center of rotation of the shift rod.

* * * * *